United States Patent Office 2,783,433
Patented Feb. 26, 1957

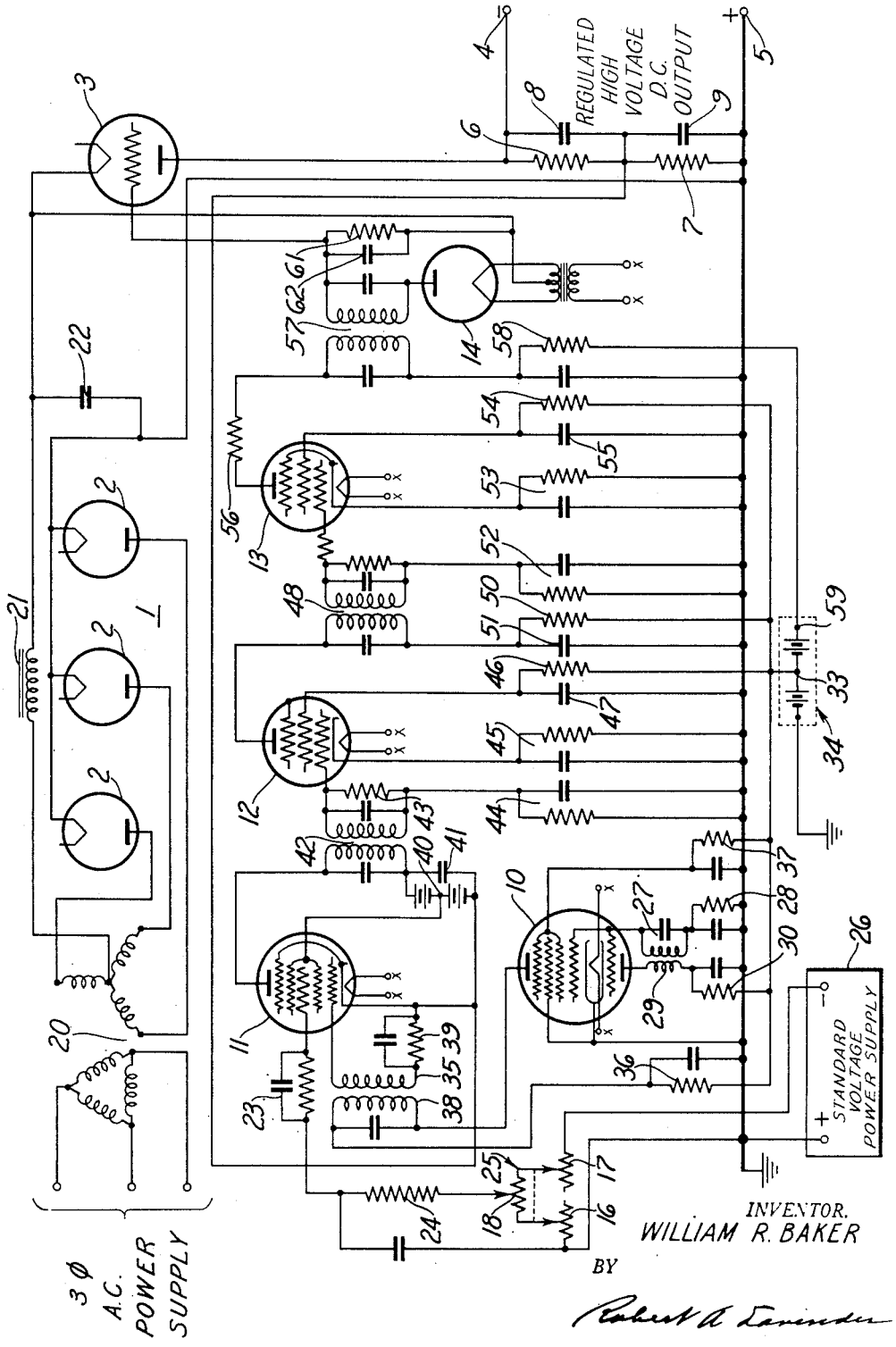

2,783,433

REGULATED POWER SUPPLY

William R. Baker, Berkeley, Calif., assignor to the United States of America as represented by the United States Atomic Energy Commission Application July 5, 1945, Serial No. 603,398

12 Claims. (Cl. 323—22)

The present invention relates to circuit networks and it relates more particularly to an improved voltage regulated power supply.

It is an object of the present invention to provide a voltage regulated power supply having a high degree of regulation.

Another object of the present invention is to provide a voltage regulated power supply having a substantially constant high degree of regulation over a wide frequency range.

Still another object of the present invention is to provide a voltage regulated power supply of great stability having a high degree of regulation over a wide frequency range.

A further object of the present invention is to provide an improved voltage regulated power supply having a voltage dividing network across its output for obtaining a fraction of the voltage output of the voltage regulated power supply which is substantially independent of ripple frequency or wave shape or of change on the characteristics of the components of the power supply.

Still a further object of the present invention is to provide an improved voltage regulated power supply having a voltage dividing network across its output terminals for obtaining a fraction of the output voltage for regulating purposes, the fraction so obtained being of the same phase as the output voltage of the regulated power supply over a wide frequency range.

The invention, both as to its organization and method of operation, together with other objects and advantages thereof, will best be understood by reference to the following specification taken in connection with the accompanying drawing which is a schematic view of an improved voltage regulated power supply embodying the features of the present invention.

Referring to the drawing, there is illustrated an R. F. voltage regulated type of high voltage power supply embodying the features of the present invention and broadly including a high voltage rectifier 1 having about a 40 kilovolt output, including the diode rectifiers 2 and the associated network, the negative terminal of the high voltage rectifier 1 being connected to the cathode of a regulator triode 3 of the 891 General Electric type, the anode of the regulator triode 3 being in turn connected to an output terminal 4 of the regulated power supply. Moreover, an output terminal 5 of the regulated power supply is grounded and connected to the positive terminal of the high voltage rectifier 1. Further, a voltage dividing network includes series-connected resistors 6 and 7 of 2 megohm and 20,000 ohm values, respectively, connected between the output terminals 4 and 5, the resistor 6 being shunted by a capacitor 8 of 0.0001 mfd. capacity and the resistor 7 being shunted by a capacitor 9 of 0.01 mfd. capacity, whereby the time constant of the RC network including the resistor 6 and capacitor 8 is substantially equal to the time constant of the RC network including the resistor 7 and the capacitor 9. An oscillator stage arranged to generate a 5 megacycle signal, including an oscillator tube 10 of the 6K8 type has its output coupled to the input of a modulator tube 11 of the 6L7 type which is cathode modulated by the voltage across the RC network including the resistor 7 and the capacitor 9. Further, the output of the modulator tube 11 is amplified by a broadly tuned two-stage R. F. amplifier including cascaded pentodes 12 and 13, of 6AG7 and 807 types, respectively, the output of the R. F. amplifier being coupled to a detector or rectifying network including a diode rectifier 14 of the 1616 type. Moreover, the negative output terminal of the rectifier including the diode 14 is connected to the control grid of the regulator triode 3, whereas the positive terminal is connected to the cathode of the regulator triode 3.

Considering now the illustrated voltage regulated power supply in detail, the high voltage rectifier includes a power transformer 20 having a delta-connected primary connected to a suitable source of three phase current and having a Y-connected secondary, the terminals of which are connected to the respective anodes of the diode rectifiers 2, the center tap of the Y-connected secondary being connected through a filter choke 21 to the cathode of the regulator triode 3. Moreover, the cathodes of the diode rectifiers 2 are connected through a filter condenser 22 to the cathode of the regulator triode 3 and grounded to the output terminal 5 of the regulated power supply.

The voltage dividing network including the series-connected resistors 6 and 7 and respective resistor shunting capacitors 8 and 9 is connected between the output terminals 4 and 5, as has been hereinbefore described, the RC product of the resistor 6 and the capacitor 8 being equal to the RC product of the resistor 7 and the capacitor 9, whereby the aforesaid RC networks have the same time constants. Thus, the voltage across the RC network including the resistor 7 and the capacitor 9 is a fixed fraction of the voltage across the output terminals 4 and 5 and is substantially independent of the frequency and wave shape of any variations or fluctuations in the output load or in the output of the high voltage rectifier 1. Furthermore, the voltage across the RC network including the resistor 7 and the capacitor 9 is substantially in phase with the voltage between the output terminals 4 and 5 over a wide frequency range.

The modulator tube 11 has its first control grid coupled to the output of the oscillator tube 10 as will be hereinafter described and has its second control grid connected through a parallel RC network 23 and a resistor 24 to the adjustable arm of a coarse and vernier potentiometer arrangement 25 connected across the output terminals of a standard voltage supply 26, the positive terminal of the standard voltage supply 26 being grounded. It should be noted that the time constant of the parallel RC network 23 is substantially less than the time constant of the parallel RC network including the resistor 7 and the capacitor 9. Moreover, the cathode of the modulator tube 11 is connected to ground through the parallel RC network including the resistor 7 and the capacitor 9 whereby the voltage across the RC network is applied as a signal to the input of the modulator tube 11.

The potentiometer arrangement 25 consists of a pair of identical rheostats 16 and 17 having their resistance elements connected to the positive and negative terminals respectively of the standard voltage supply 26 and having their adjustable arms connected by the resistance element of a potentiometer 18, the adjustable arm of the potentiometer 18 being in turn connected through the resistor 24 and the RC network 23 to the second control grid of the modulator tube 11. Moreover, the adjustable arms of the rheostats 16 and 17 are so gauged that upon adjustment of the rheostats 16 and 17 an increase in the resistance of the effective portion of the rheostat 16 is accompanied by a corresponding identical decrease in the resistance of the effective portion of the rheostat 17. Similarly a decrease in the resistance of the effective portion of the rheostat 16 is accompanied by a corresponding identical increase in the resistance of the effective portion of the rheostat 17. Thus the loading of the standard voltage supply 26 of about 400 volts is substantially constant inasmuch as the sum of the resistances of the effective portions of the rheostats 16 and 17 and the resistance element of the potentiometer 18 is constant and independent of the adjustment of the potentiometer arrangement 25. It should be noted that since the second control grid of the modulator tube 11 is normally at a negative potential with respect to the cathode of the modulator tube 11 the loading of the modulator tube 11 on the standard voltage 26 is negligible.

The oscillator tube 10 is of the triode-pentode type having its cathode grounded and having the control grids of both sections of the tube connected through a series-connected parallel resonant RL circuit 27 and parallel RC network 28 to ground. The anode of the triode section of the oscillator tube 10 is connected through a tickler coil 29 which is inductively coupled to the inductor of the resonant circuit 27 and through a resistor 30 to the midpoint positive terminal 33 of a suitable power supply 34, the negative terminal of which is grounded. The anode of the pentode section of the oscillator tube 10 is connected through a parallel resonant LC network 38 and a resistor 36 to the terminal 33 of the power supply 34, and also the screen grid of the pentode section of the oscillator tube 10 is connected through a resistor 37 to the terminal 33 of the power supply 34.

The inductor section of the network 38 is inductively coupled to a winding 35 having one end connected to the first control grid of the modulator tube 11 and having its other end connected through a parallel RC network 39 to the cathode of the modulator tube 11, the cathode being in turn connected to the negative terminal of a suitable power supply 40. Moreover, the anode of the modulator tube 11 is connected through the tuned primary of an R. F. transformer 42 to the high positive terminal of the power supply 40 and to cathode through an R. F. by-pass condenser 41, the screen grid of the oscillator tube 11 being connected to the mid positive terminal of the power supply 40.

The tuned secondary of the R. F. transformer 42 is shunted by a resistor 43 and has one of its terminals connected to the control grid of the pentode 12 and its other terminal connected through a parallel RC network 44 to ground. Moreover, the cathode of the pentode 12 is connected through parallel RC network 45 to ground, whereas the screen grid is connected through a resistor 46 to the terminal 33 of the power supply 34 and is grounded through an R. F. by-pass condenser 47. Further, the anode of the pentode 12 is connected to the tuned primary of an R. F. transformer 48 and through a resistor 50 to the terminal 33 of the power supply 34, the junction point of the resistor 50 and the primary of the R. F. transformer 48 being grounded through a by-pass condenser 51.

Similar to the first stage of the R. F. amplifier including the pentode 12, the control grid of the pentode 13 is connected through the resistor shunted secondary of the R. F. transformer 48 and a parallel RC network 52 to ground, the cathode of the pentode 13 being grounded to the parallel RC network 53 and the screen grid of the pentode 13 being connected through a resistor 54 to the terminal 33 of the power supply 34 and being grounded through the by-pass condenser 55. Moreover, the anode of the pentode 13 is connected through a resistor 56, the tuned primary of an R. F. transformer 57, and a resistor 58 to a high positive terminal 59 of the power supply 34. The tuned secondary of the R. F. transformer 57 has one terminal connected to the control grid of the regulator triode 3 and has its other terminal connected to the anode of a diode rectifier 14, the cathode of the diode rectifier 14 being in turn connected to the cathode of the regulator triode 3. Further, a resistor 61 shunted by a capacitor 62 is connected between the control grid and the cathode of the regulator triode 3, whereby the voltage across the network including the resistor 61 and the capacitor 62 is impressed as a signal on the control grid of the regulator triode 3.

Considering now the operation of the improved voltage regulated power supply above described, a rise in the voltage between the output terminals 4 and 5 results in a rise in the voltage across the network including the resistor 7 and the capacitor 9 which is impressed as a positive signal on the second control grid of the modulator tube 11. As has been heretofore described, the voltage impressed on the cathode of the modulator tube 11 is substantially in phase and a fixed fraction of the voltage between the output terminals 4 and 5 and is substantially independent of the wave shape of the change in voltage, the voltage on the second control grid remaining substantially constant. The R. F. output of the oscillator tube 10 is coupled to the first control grid of the modulator tube 11 and the amplitude of the amplified output of the modulator tube 11 is raised by the impressed positive signal on the second control grid of the modulator tube 11. The increased R. F. output of the modulator tube 11 is in turn amplified by the R. F. amplifier including the pentodes 12 and 13 and rectified by the detector network including the diode rectifier 14 and applied as an increase in the negative signal applied to the control grid of the regulator triode 3. The increased negative signal applied to the control grid of the regulator triode 3 increases the resistance of the regulator triode 3, thus reducing the voltage between the output terminals 4 and 5 and urging it to its original preset value. Similarly, a drop in the voltage between the output terminals 4 and 5 is followed by a negative signal on the second control grid of the modulator tube 11 and a drop in the amplitude of the R. F. output of the modulator tube 11. The reduced amplitude R. F. signal is amplified by the R. F. amplifier including the pentodes 12 and 13 and rectified by the detecting network including the diode rectifier 14, the reduction in the amplitude of the R. F. signal being reflected by a drop in the negative signal on the control grid of the regulator triode 3 and a decrease in the resistance of the regulator triode 3. The decrease in the resistance of the regulator triode 3 is followed by an increase in the voltage between the output terminals 4 and 5, thus urging the output voltage to its original preset value. It should be noted that the voltage regulated output between the output terminals 4 and 5 may be adjusted by varying the setting of the potentiometer 25 associated with the standard voltage supply 26.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A voltage regulated power supply comprising a source of D. C. voltage, a pair of output terminals, a variable resistor being connected between said source of voltage and one of said output terminals, a voltage dividing network including resistors connected in series between said output terminals, and compensating capacitors connected in parallel with said resistors, a portion of said voltage dividing network having substantially the same time constant as the remainder of said voltage dividing network, and means for controlling the resistance of said variable resistor in response to the voltage across said portion of said voltage dividing network.

2. A voltage regulated power supply comprising a source of D. C. voltage, a pair of output terminals, a regulator tube including a cathode and an anode and a control grid connected between said voltage source and one of said output terminals, a voltage dividing network including a series combination of two parallel resistance-capacitance circuits connected between said output terminals, the portion of said voltage dividing network having substantially the same time constant as the remainder of said voltage dividing network, and means responsive to the voltage across said portion of said voltage dividing network for applying a signal to the control grid of said regulator tube.

3. A voltage regulated power supply comprising a source of D. C. voltage, a pair of output terminals, a regulator tube including a cathode and an anode and a control grid connected between said source of voltage and one of said output terminals, a resistor connected between said output terminals, a first capacitor connected across a first portion of said resistor, a second capacitor connected across the remainder of said resistor, the time constant of said first capacitor and said first portion of said resistor being substantially equal to the time constant of said second capacitor and said second portion of said second resistor, and means responsive to the voltage across said first portion of said resistor for controlling the signal on a control grid of said regulator tube.

4. A voltage regulated power supply comprising a source of D. C. voltage, a pair of output terminals, a regulator tube including a cathode and an anode and a control grid connected between said source of voltage and one of said output terminals, a resistor connected between said output terminals, a first capacitor connected across a first portion of said resistor, a second capacitor connected across the remainder of said resistor, the phase relationship between the voltage across the first portion of said resistor and the voltage between said output terminals being substantially independent of the frequency of said voltage, and means responsive to the voltage across said first portion of said resistor for controlling the signal on a control grid of said regulator tube.

5. A voltage regulated power supply comprising a source of D. C. voltage, a pair of output terminals, a regulator tube including a cathode and an anode and a control grid connected between said source of voltage and one of said output terminals, a resistor connected between said output terminals, a first capacitor connected across a first portion of said resistor, a second capacitor connected across the remainder of said resistor, the voltage across said first portion of said resistor being in phase with the voltage between said output terminals, said phase relationship being substantially independent of the frequency of said voltages, and means responsive to the voltage across said first portion of said resistor for controlling the signal on a control grid of said regulator tube.

6. A voltage regulated power supply comprising a source of D. C voltage, a pair of output terminals, a regulator tube including a cathode and an anode and a control grid connected between said source of D. C. voltage and one of said output terminals, a voltage dividing network including resistors connected between said output terminals and capacitors individually connected in parallel with said resistors, a portion of said voltage dividing network having substantially the same time constant as the remainder of said voltage dividing network, an oscillator, a means for modulating the output of said oscillator in response to the voltage across said portion of said voltage dividing network, and means for controlling the signal on the control grid of said regulator tube in response to the modulated output of said oscillator.

7. A voltage regulated power supply comprising a source of D. C. voltage, a pair of output terminals, a regulator tube including a cathode and an anode and a control grid connected between said source of D. C. voltage and one of said terminals, a voltage dividing network including a resistance having two parts connected in series between said output terminals and capacitance connected in parallel with each part of said resistance, a portion of said voltage dividing network having substantially the same constant as the remainder of said voltage dividing network, an oscillator, a modulator, the output of said oscillator and the voltage across said portion of said voltage dividing network being applied to the input of said modulator, and means responsive to the output of said modulator for controlling the signal on the control grid of said regulator tube.

8. A voltage regulated power supply comprising a source of D. C. voltage, a pair of output terminals, a regulator tube including a cathode and an anode and a control grid connected between said source of D. C. voltage and one of said output terminals, a voltage dividing network including two portions connected in series between said output terminals, the portions of said voltage dividing network comprising parallel resistance-capacitance circuits having substantially equal time constants, an oscillator, means for modulating the output of said oscillator in response to the voltage across one portion of said voltage dividing network, and a detector connected between the control grid and the cathode of said regulator tube, said detector being coupled to said oscillator.

9. A voltage regulated power supply comprising a source of D. C. voltage, a pair of output terminals, a regulator tube including a cathode and an anode and a control grid connected between said source of D. C. voltage and one of said output terminals, a voltage dividing network including two parallel resistance-capacitance circuits connected in series between said output terminals, a portion of said voltage dividing network having substantially the same time constant as the remainder of said voltage dividing network, an oscillator, a modulator including an electron tube having a cathode and a control grid, said first portion of said voltage dividing network being connected in series with said cathode of said electron tube, means for coupling the output of said oscillator to the input of said electron tube, and means responsive to the output of said electron tube for controlling the signal on the control grid of said regulator tube.

10. A voltage regulated power supply including a source of D. C. voltage, a pair of output terminals, a regulator tube including a cathode and an anode and a control grid, said regulator tube being connected between said source of D. C. voltage and one of said output terminals, a voltage dividing network including resistors connected between said output terminals and capacitors individually connected in parallel with said resistors, a portion of said voltage dividing network having substantially the same time constant as the remainder of said voltage dividing network, an oscillator, a modulator tube including a cathode and a first control grid and a second control grid, a standard voltage, said first control grid being coupled to said oscillator and said second control grid being connected through said standard voltage and said portion of said voltage dividing network to the cathode of said modulator tube, and a detector having its output connected between the control grid and the cathode of said regulator tube, the input to said detector being connected to the output of said modulator tube.

11. A voltage regulated power supply including a source of D. C. voltage, a pair of output terminals, a regulator tube including a cathode and an anode and a control grid, said regulator tube being connected between said source of D. C. voltage and one of said output terminals, a voltage dividing network including resistors connected between said output terminals and capacitors individually connected in parallel with said resistors, a portion of said voltage dividing network having substantially the same time constant as the remainder of said voltage dividing network, an oscillator, means for modulating the output of said oscillator in response to the voltage across said portion of said voltage dividing network, means for amplifying the modulated output of said oscillator, and a detector having its output connected between the control grid and the cathode of said regulator tube, the input to said detector being coupled to the output of said amplifying means.

12. A voltage regulated power supply comprising a source of D. C. voltage, a pair of output terminals, a regulator tube including a cathode and an anode and a control grid, said regulator tube being connected between said source of D. C. voltage and one of said output terminals, a resistor connected between said output terminals, a first capacitor connected across a portion of said resistor and a second capacitor connected across the remainder of said resistor whereby the time constants of said first capacitor and said first portion of said resistor and the second capacitor and the remainder of said resistor are substantially equal, an oscillator, a modulator tube including a cathode, a first control grid and a second control grid, a variable standard voltage, said first control grid being coupled to the output of said oscillator, and said second control grid being connected through said variable standard voltage and said portion of said voltage dividing network to the cathode of said modulator tube, an amplifier having its input connected to the output of said modulator tube, and a detector stage having its output connected between the control grid and the cathode of said regulator tube and having its input connected to the output of said amplifier.

References Cited in the file of this patent

UNITED STATES PATENTS

| | | |
|---|---|---|
| 1,582,060 | Lovejoy | Apr. 27, 1926 |
| 2,057,520 | Gulliksen | Oct. 13, 1936 |
| 2,147,446 | Koch | Feb. 14, 1939 |
| 2,268,790 | White | Jan. 6, 1942 |
| 2,277,284 | Winther | Mar. 24, 1942 |
| 2,302,900 | Vance | Nov. 24, 1942 |
| 2,313,601 | Terry | Mar. 9, 1943 |
| 2,318,644 | Tubbs | May 11, 1943 |
| 2,376,438 | Little | May 25, 1945 |
| 2,398,916 | Brewer | Apr. 23, 1946 |